W. H. MUZZY.

FUEL FEEDING DEVICE FOR AUTOMOBILES.

APPLICATION FILED OCT. 25, 1918.

Reissued Mar. 4, 1919.

14,602.

2 SHEETS—SHEET 1.

Inventor:
William H. Muzzy,
by Burton & Burton
his Attys.

Witness:
C. H. Lawrence

W. H. MUZZY.

FUEL FEEDING DEVICE FOR AUTOMOBILES.

APPLICATION FILED OCT. 25, 1918.

Reissued Mar. 4, 1919.

14,602

2 SHEETS—SHEET 2.

Inventor:
William H. Muzzy.
by Burton & Burton
his Attys.

Witness.
C. S. Hunter

UNITED STATES PATENT OFFICE.

WILLIAM H. MUZZY, OF CHICAGO, ILLINOIS.

FUEL-FEEDING DEVICE FOR AUTOMOBILES.

14,602. Specification of Reissued Letters Patent. Reissued Mar. 4, 1919.

Original No. 1,201,077, dated October 10, 1916, Serial No. 15,895, filed March 20, 1915. Application for reissue filed October 25, 1918. Serial No. 259,727.

*To all whom it may concern:*

Be it known that I, WILLIAM H. MUZZY, a citizen of the United States, residing at Chicago, in the county of Cook and State of Illinois, have invented new and useful Improvements in Fuel-Feeding Devices for Automobiles, of which the following is a specification, reference being had to the accompanying drawings, forming a part thereof.

This invention relates to improvements in motor vehicles and has more particular relation to improvements in mechanisms, systems and devices for the feeding of liquid gasolene to the carbureters of explosive gas engines.

One of the objects of the invention is the improvement of the devices and mechanisms at present employed in the so called "vacuum systems" for feeding gasolene from a relatively low supply tank to the carbureter of the engine.

Another object of the invention is the elimination in my improved tank of all floats, float valves, flap valves and other similar mechanical valves which are subject to misoperation and derangement from the presence of small particles of dirt or other foreign matter in the gasolene or from wear.

A further object of the invention is the elimination of all movable parts which as is well known are subject to misoperation and derangement from the vibration and jars they are subjected to when used in connection with motors and motor cars.

A still further object of the invention is to utilize the vacuum to raise the gasolene to a gravity feed tank and to control its feed from such tank to the carbureter by the presence or absence of the gasolene within the gravity tank without any movable mechanical devices.

In carrying these and other objects of the invention into effect I utilize certain constructions, combinations and arrangements of parts all of which will be hereinafter more particularly set forth and claimed.

In carrying out my invention in its preferred form of embodiment I have shown in the accompanying drawings certain constructions and combinations but it will be readily understood that these may be varied and other similar devices employed without departing from the spirit of this invention.

Figure 1:
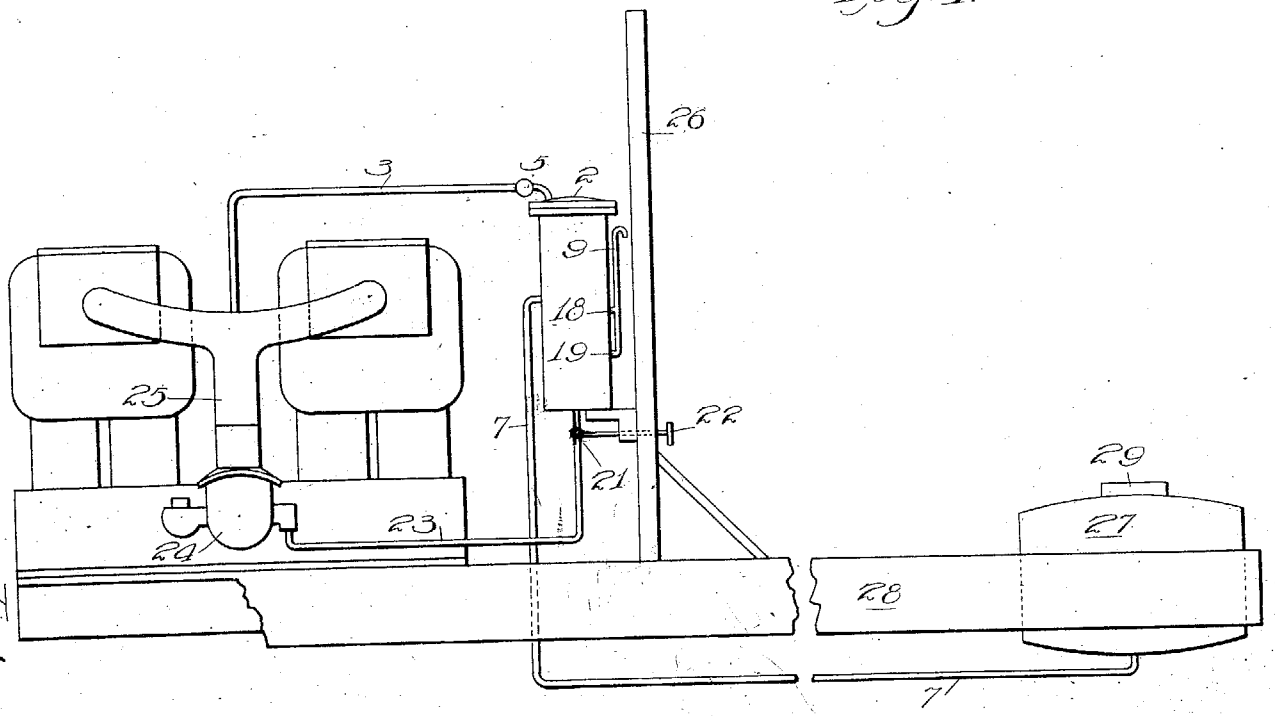
Figure 2:
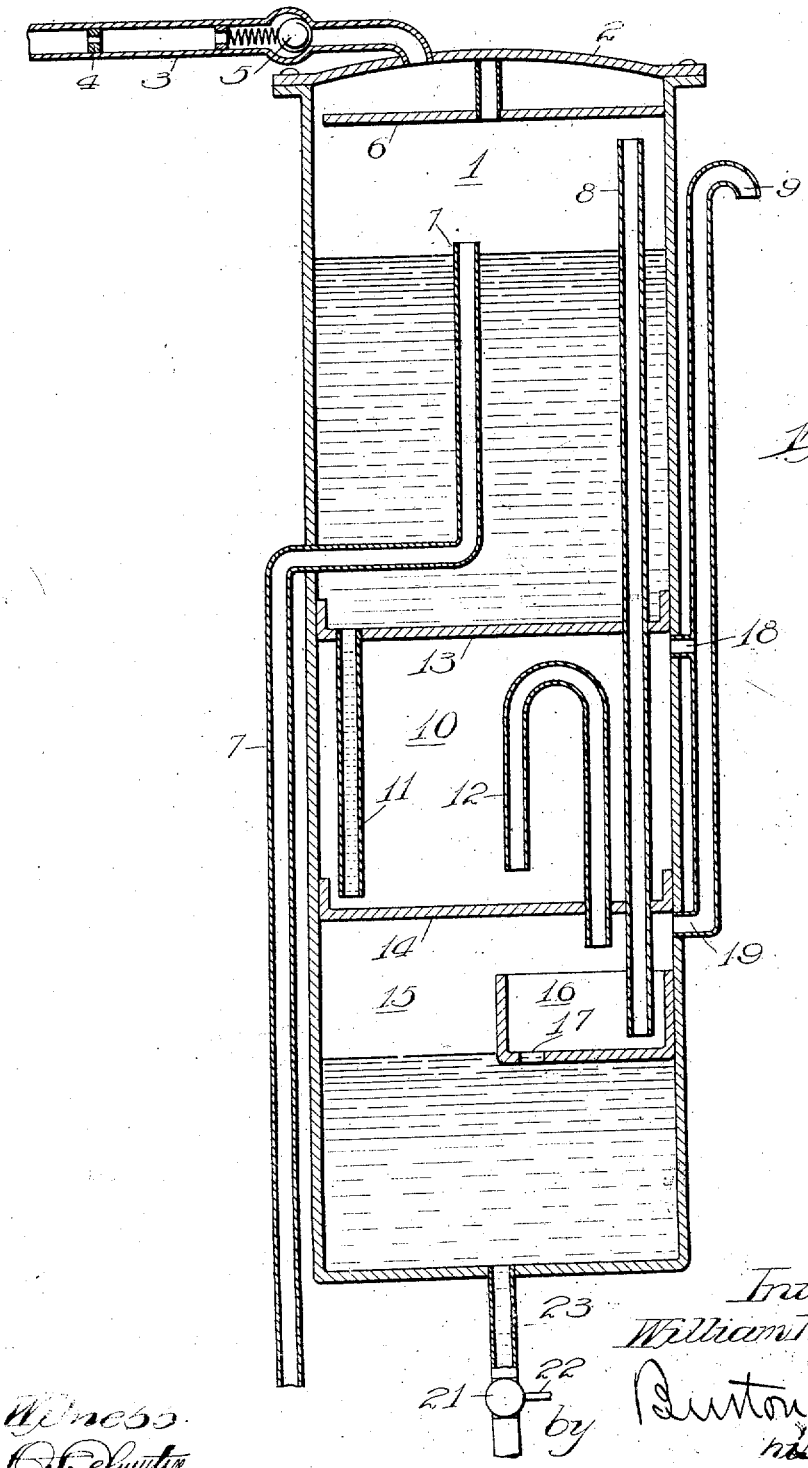

In the aforesaid drawings:

Figure 1 represents, in side elevation, a gas engine, parts of the chassis, the carbureter, the main gasolene tank and my improved vacuum and siphon tank and connections, and Fig. 2 represents a detail vertical section through my improved vacuum and siphon tank and connections.

In general terms the invention may be described as utilizing part of the suction in the intake manifold of the engine to create a vacuum in a small tank secured to the dash board of the machine above the engine and thus draw the gasolene from the main supply tank at the rear up into this vacuum tank. The gasolene is then fed by gravity from this vacuum tank or chamber to an intermediate trap or chamber and then from this latter chamber by a siphon into a chamber which supplies the carbureter by gravity. When the level of the gasolene in the carbureter supply chamber falls too low the lower end of an air pipe in this chamber is uncovered and air rushes through this pipe into the upper end of the vacuum chamber and relieves the vacuum. The gasolene then flows by gravity from the vacuum chamber to an intermediate chamber and from this latter chamber to the carbureter supply chamber until the lower end of the air pipe is again closed when the vacuum is again established and a fresh supply of gasolene is drawn from the main tank. When the vacuum is broken as above described all surplus gasolene flows back into the main tank at the rear.

In the before mentioned drawings 2 represents the vacuum tank, 3, the air suction pipe of the same, 24 the carbureter, 25 the intake manifold, 27 the main gasolene tank at the rear of the machine, 23 the supply pipe from the carbureter, 7 the pipe connecting the vacuum tank and the main tank and 9 the breather pipe of the vacuum tank.

The pipe, 3, connects at one end to manifold, 25, and at its opposite end to the detachable cover of the tank, 2.

An obstructing wall, 4, having a small aperture therein is mounted in the pipe, 3, to cause the right amount of suction to be exerted in the chamber, 1. The size of the aperture in this wall is determined by the type of engine with which my invention is to be used but after being once determined it remains fixed and set. An ordinary ball check valve, 5, is also mounted in the pipe, 3, to prevent any air passing back through this pipe in the opposite direction from the suction.

The chambers, 1, 10 and 15 of the tank are formed by horizontal partitions, 13 and 14, suitably secured in the tank. The chambers, 10 and 15, are open to the air at all times by means of a vent pipe, 9, connected to them by short pipes, 18 and 19.

The main supply pipe 7, is connected to the bottom of the tank, 27, at one end and at its opposite end enters the chamber, 1, and projects upward into the same about two-thirds of its height. By this means there is always sufficient gasolene in the chamber, 1, to more than fill the chamber, 10, and to supply the gasolene used from the chamber 15.

The gasolene when relieved of the vacuum flows from the chamber, 1, down through the pipe, 11, until the chamber, 10, is almost filled. The gasolene then starts to flow through the siphon, 12, into the pan, 16, fast to the side wall of the chamber, 15. The gasolene flows through an aperture, 17, in the bottom of this pan and raises the level of the gasolene in the chamber, 15, until the lower end of the pipe, 8, is covered. This pipe projects from near the bottom of the pan, 16, to near the top of the chamber, 1, and is an air vent pipe for relieving the vacuum in the chamber, 1, so that when the lower end is covered the air is cut off from the chamber, 1, and the vacuum is again established. The gasolene is drawn up the pipe, 8, into the chamber, 1, until the level of the gasolene in the chamber, 15, descends sufficiently to permit air to again pass up the pipe, 8, when the vacuum is again relieved and the gasolene again passes down the pipe, 11, and the operation is repeated. Just as soon as the gasolene covers the lower end of the pipe, 8, part of the gasolene in the chamber, 10, is drawn up through the pipe, 11, but since the chamber, 10, has always atmospheric communication through the passage, 18, and vent pipe, 9, the gasolene continues to flow through the siphon, 12, until the level in the chamber, 10, reaches the lower end of the siphon in said chamber. The diameter of the siphon pipe, 12, is greater than that of the pipe, 8, and a large stream of gasolene is thus fed to the chamber, 15, and completely fills the pipe, 8, which draws it up into the chamber, 1, as before described; so that it will be seen that the delivery of the liquid fuel to the supply chamber, 15, takes place irrespective of suction in the vacuum chamber, 1. When the pumping action starts gasolene is being drawn from the main feed pipe, 7, from the pipe, 11, and from the pipe, 8, but as the end of the siphon in the chamber, 10, is above the lower end of the pipe, 11, the latter will continue to draw or be covered while the air will start up through the pipe, 8, and thus relieve the vacuum again. Any gasolene that is above the upper end of the pipe, 7, when the vacuum is relieved will pass down the pipe, 7, and back to the main tank.

The office of the pan, 16, is to prevent the gasolene in the chamber, 15, from slopping up against the lower end of the pipe, 8, because of the motion of the car and thus preventing the free passage of air through this pipe.

A guard plate, 6, is suspended from the cover of the tank leaving a passage at one side and to prevent the streams from the pipes, 8 and 7, and the splash from the chamber, 1, from entering the pipe, 3. The construction and capacities of the several chambers are such that the level of the gasolene never goes above the upper end of the pipe, 8. The cross sectional areas of pipes 8 and 11 are so restricted that when they are full of gasolene the chamber, 1, is practically sealed and the suction through the pipe, 3, will create a vacuum sufficient to raise the gasolene from the tank, 27. This continues as long as pipes, 8 and 11, are so restricted that when they are full of gasolene the chamber, 1, is practically sealed and the suction through pipe, 3, will create a vacuum sufficient to raise the gasolene from the tank, 27. This continues as long as pipes, 8 and 11, are full of gasolene as the liquid cannot escape from them into the chamber, 1, fast enough to counteract the vacuum being created by the intense suction from the pipe, 3.

The operation of the tank is entirely automatic and continuous, the gasolene being first drawn into chamber, 1, then allowed to descend to chamber, 10, then partly siphoned to chamber, 15, and finally drawn into chamber, 1, again. Each time that the gasolene is drawn into the chamber, 1, the pipe, 7, will feed more gasolene than the engine is using, this surplus each time passing down the pipe, 7, again, that is, after the level of the gasolene in the chamber, 1, reaches above the upper end of the pipe, 7.

The pipe, 23, which connects chamber, 15, to the carbureter is provided with any ordinary valve, 21, for opening and closing the pipe at will. This valve is operated by a rod, 22, which projects through the dashboard, 26, and is provided with an operating knob. This valve, 21, is a night valve and is supposed to be used if desired, when the machine is left standing for any great length of time to prevent the escape of gasolene from the chamber, 15. This escape of gasolene would only be possible however if the machine had a leaky float valve in the carbureter.

It will also be understood that while I have provided the guard plate, 6, to prevent gasolene entering the pipe, 3, many other constructions may be employed that would accomplish the same result.

It will be observed that with my improved construction of tank the pipe, 3, is always drawing a constant stream of air saturated with gasolene gases which have been created by the agitation of the gasolene in the chambers, 1, and 15, and that for this reason the perfect operation of the engine is not interfered with after the carbureter is once set in accord with this mixture.

It will be understood that the check valve, 5, is not essential to the operation of my improved tank but it gives a more even suction on the feed pipe, 7. The suction on the pipe, 3, is strong enough to raise the gasolene from the main tank, 27, in a spurting stream not only when the machine is on a level but also when it is climbing a 45 per cent. grade. The location of the tank, 2, in relation to the tank, 27, is such, however, that when the machine is going down a grade the chamber, 1, of the tank is always higher than the tank, 27.

I claim:—

1. In a fuel feeding system, the combination of a main low level fuel tank, a vacuum chamber at a higher level, a liquid conduit from the low tank to the vacuum chamber, means for producing partial vacuum in the vacuum chamber for lifting liquid by suction from the low tank, a chamber to which liquid is supplied by gravity from that which is lifted by the suction of the vacuum chamber, and means for admitting air to the vacuum chamber controlled solely by the level of the liquid in said gravity supplied chamber.

2. In a structure as defined in claim 1 foregoing, the means for admitting air to the vacuum chamber, consisting of an air inlet passage leading into that chamber whose intake is sealed by the liquid in said gravity supply chamber.

3. In a fuel feeding system the combination with an elevated tank having a vacuum chamber and a supply chamber, the latter having atmospheric communication, means for creating a vacuum in the vacuum chamber, an unobstructed passage between said two chambers constituting an air inlet for the vacuum chamber sealed and unsealed by the liquid fuel in the supply chamber, a main supply tank connected to the vacuum chamber, and connections for liquid flow between the vacuum chamber and the supply chamber.

4. In a fuel feeding system, the combination with a main low level tank, of an elevated vacuum tank having a vacuum chamber and a supply chamber; means for creating vacuum in the vacuum chamber and for admitting atmospheric pressure thereto, and for alternating the dominance of suction and atmospheric pressure therein; means connecting the low level tank with the vacuum chamber, and means intermediate the vacuum chamber and the supply chamber for delivering fuel to the latter irrespective of suction in the former.

5. A structure as defined in claim 4 foregoing, having the means for alternating the dominance of suction and atmospheric pressure in the vacuum chamber, comprising an air inlet for the vacuum chamber which is sealed and unsealed at its air intake by the liquid fuel in the supply chamber.

6. In combination with a main low level fuel supply tank, a vacuum chamber at a higher level and means for producing a partial vacuum therein; a liquid conduit from the low level tank to the vacuum chamber; an atmosphere inlet pipe opening into the vacuum chamber; a second chamber which is supplied with liquid by gravity flow; a third chamber having atmospheric communication and in which the atmosphere inlet pipe opens for intake, and a siphon connecting said third chamber with said second chamber for delivery of liquid from the second chamber into the third for periodically sealing the intake of the atmosphere inlet pipe in the third chamber at intervals according to the relative time of filling said second chamber by gravity and emptying it by the siphonic action.

7. In a fuel feeding system the combination with a main tank, of an elevated vacuum tank having a vacuum chamber and a supply chamber, stationary means connecting the two chambers for allowing liquid fuel to pass to the supply chamber without allowing air to pass to the vacuum chamber, an air inlet for the vacuum chamber sealed and unsealed by the liquid in the supply chamber, means connecting the main tank and the vacuum chamber, and means for creating a vacuum in the vacuum chamber.

8. In a fuel feeding system the combination with a main tank, of an elevated vacuum tank having a vacuum chamber, a supply chamber, and an intermediate chamber, an air inlet for the vacuum chamber sealed and unsealed by the liquid fuel in the supply chamber, a siphon in the intermediate chamber discharging into the supply chamber, connections between the vacuum chamber and intermediate chamber, means connecting the main tank to the vacuum chamber, and means for creating a vacuum in the vacuum chamber.

9. In a fuel feeding system the combination with a main tank, of an elevated vacuum tank connected thereto and having a vacuum chamber and a supply chamber, stationary fuel feeding and unobstructed air inlet means connecting the vacuum and supply chambers, said air inlet means being sealed and unsealed by the liquid fuel, and means for creating a vacuum in the vacuum chamber.

10. In a fuel feeding system the combination with an elevated tank having a vacuum chamber and a supply chamber, means for creating a vacuum in the vacuum chamber, a main tank, a feed pipe connecting this tank and the vacuum chamber, a discharge pipe for the vacuum chamber arranged to be sealed by the liquid fuel to prevent air passing into the vacuum chamber, and an air inlet pipe extending up into the vacuum chamber and arranged to be sealed by the liquid in the supply chamber.

In testimony whereof, I have hereunto set my hand at Chicago, Illinois, this 28th day of September, 1918.

WILLIAM H. MUZZY.